(12) United States Patent
Lujan et al.

(10) Patent No.: US 11,345,277 B2
(45) Date of Patent: May 31, 2022

(54) AUTONOMOUS VEHICLE INTENT SIGNALING

(71) Applicant: GM GLOBAL TECHNOLOGY OPERATIONS LLC, Detroit, MI (US)

(72) Inventors: Eric Lujan, San Francisco, CA (US); Shiva Ghose, Berkeley, CA (US); Elliot Branson, San Francisco, CA (US); Peter Ming Gao, San Francisco, CA (US); Zhichang Yan, San Francisco, CA (US); Zhizhong Yan, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 16/161,206

(22) Filed: Oct. 16, 2018

(65) Prior Publication Data

US 2020/0114813 A1 Apr. 16, 2020

(51) Int. Cl.
*B60Q 1/50* (2006.01)
*B60Q 1/26* (2006.01)
(Continued)

(52) U.S. Cl.
CPC .............. *B60Q 1/50* (2013.01); *B60Q 1/2611* (2013.01); *B60Q 5/005* (2013.01); *B60W 10/04* (2013.01);
(Continued)

(58) Field of Classification Search
CPC ................................ B60Q 1/50; B60Q 1/2611
See application file for complete search history.

(56) References Cited

U.S. PATENT DOCUMENTS 8,954,252 B1 2/2015 Urmson et al.
9,196,164 B1 * 11/2015 Urmson ................. G08G 1/166
(Continued)

OTHER PUBLICATIONS

"International Search Report for PCT Patent Application No. PCT/US2019/056305", dated Jan. 24, 2020, 5 Pages.
(Continued)

*Primary Examiner* — Elaine Gort
*Assistant Examiner* — Tarek Elarabi
(74) *Attorney, Agent, or Firm* — Calfee, Halter & Griswold LLP

(57) ABSTRACT

Various technologies described herein pertain to controlling an autonomous vehicle to provide indicators that signal a driving intent of the autonomous vehicle. The autonomous vehicle includes a plurality of sensor systems that generate a plurality of sensor signals, a notification system, and a computing system. The computing system determines that the autonomous vehicle is to execute a maneuver that will cause the autonomous vehicle to traverse a portion of a driving environment of the autonomous vehicle. The computing system predicts that a person in the driving environment is to traverse the portion of the driving environment based upon the plurality of sensor signals. The computing system then controls the notification system to output a first indicator indicating that the autonomous vehicle plans to yield to the person or a second indicator indicating that the autonomous vehicle plans to execute the maneuver prior to the person traversing the portion of the driving environment.

20 Claims, 13 Drawing Sheets

(51) Int. Cl.
  *B60Q 5/00* (2006.01)
  *B60W 10/04* (2006.01)
  *B60W 10/18* (2012.01)
  *B60W 50/00* (2006.01)
  *G05D 1/00* (2006.01)

(52) U.S. Cl.
  CPC ........ *B60W 10/18* (2013.01); *B60W 50/0097* (2013.01); *G05D 1/0088* (2013.01); *B60W 2420/42* (2013.01); *B60W 2420/52* (2013.01); *B60W 2554/00* (2020.02); *B60W 2710/08* (2013.01); *B60W 2710/18* (2013.01); *B60W 2710/30* (2013.01)

(56) References Cited

U.S. PATENT DOCUMENTS

| | | | |
|---|---|---|---|
| 9,483,948 | B1 | 11/2016 | Gordon et al. |
| 9,694,736 | B2 | 7/2017 | Williams et al. |
| 9,804,599 | B2 * | 10/2017 | Kentley-Klay .......... B60Q 1/26 |
| 9,855,890 | B2 * | 1/2018 | James .................... B60Q 1/503 |
| 9,902,311 | B2 * | 2/2018 | Sweeney ............. B60Q 1/2696 |
| 9,953,538 | B1 * | 4/2018 | Matthiesen ............ B60Q 1/482 |
| 10,152,892 | B2 * | 12/2018 | Matthiesen ............ G08G 1/005 |
| 10,650,675 | B2 * | 5/2020 | Saito ........................ G06F 1/00 |
| 2011/0140919 | A1 | 6/2011 | Hara et al. |
| 2015/0268665 | A1 | 9/2015 | Ludwick et al. |
| 2015/0336502 | A1 | 11/2015 | Hillis et al. |
| 2016/0167648 | A1 | 6/2016 | James et al. |
| 2017/0240096 | A1 | 8/2017 | Ross et al. |
| 2017/0240098 | A1 | 8/2017 | Sweeney et al. |
| 2018/0136654 | A1 | 5/2018 | Kentley-Klay et al. |
| 2018/0240344 | A1 | 8/2018 | Matthiesen et al. |

OTHER PUBLICATIONS

"Written Opinion of the International Searching Authority for PCT Patent Application No. PCT/US2019/056305", dated Jan. 24, 2020, 8 Pages.

"International Preliminary Report on Patentability for PCT Patent Application No. PCT/US2019/056305", dated Apr. 14, 2021, 9 Pages.

"Communication pursuant to Rules 161(1) and 162 EPC for European Patent Application No. 19798427.1", dated Mar. 3, 2021, 3 Pages.

"Reply to Office Action for European Patent Application No. 19798427.1", Filed Date: Sep. 13, 2021, 9 Pages.

* cited by examiner

AUTONOMOUS VEHICLE INTENT SIGNALING

BACKGROUND

An autonomous vehicle is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

It is well known that human drivers adhere to traffic rules when operating conventional vehicles. For instance, drivers cause conventional vehicles to stop at red lights and stop signs, proceed through intersections at green lights, signal an intent to turn with turn signals, etc. However, it is understood that in certain driving scenarios, application of traffic rules may be unclear. In an example, when a first vehicle and a second vehicle arrive at an intersection with stop signs at the same time, it may be unclear as to whether the first vehicle or the second vehicle has the right-of-way. In another example, when a first vehicle is stopped on a road (e.g., waiting to parallel park, dropping off a passenger, etc.) in front of a second vehicle on the road, it may be unclear as to whether the second vehicle should maneuver around the first vehicle or wait for the first vehicle to begin moving again. In yet another example, when a pedestrian is about to cross a road, it may be unclear as to whether a vehicle operating on the road should yield to the pedestrian or whether the pedestrian should yield to the vehicle.

Conventionally, these scenarios are resolved through signals initiated or performed by a driver that communicate intent of the driver. For instance, if a first driver wishes to yield a right-of-way to a second driver, the first driver may make a hand gesture (e.g., a wave) towards the second driver, flash headlights of his/her vehicle at a vehicle of the second driver, beep a horn of his/her vehicle, etc.

Conventional autonomous vehicles are not well suited for the above-described scenarios as autonomous vehicles do not have human drivers to signal intent. Thus, in the scenarios identified above, a conventional autonomous vehicle may attempt to navigate based upon motion of the other vehicle/pedestrian. This may lead to feedback loops where the autonomous vehicle begins to move in response to the vehicle/pedestrian stopping, ceases moving in response to the vehicle/pedestrian beginning to move, and again begins to move when the vehicle/pedestrian stops in response to the autonomous vehicle beginning to move. This may lead to undesirable situations in which it is unclear as to whether the autonomous vehicle is yielding to the vehicle/pedestrian.

SUMMARY

The following is a brief summary of subject matter that is described in greater detail herein. This summary is not intended to be limiting as to the scope of the claims.

Described herein are various technologies that pertain to controlling an autonomous vehicle to provide an indicator to a person in a driving environment of the autonomous vehicle that indicate intent of the autonomous vehicle. With more specificity, described herein are various technologies pertaining to controlling a notification system of an autonomous vehicle configured to output an indicator that is perceivable external to the autonomous vehicle. In an example, the indicator may indicate that the autonomous vehicle detects the person and that the autonomous vehicle plans to yield to the person to enable the person to traverse a portion of a driving environment of the autonomous vehicle. In another example, the indicator may indicate that the autonomous vehicle detects the person and that the autonomous vehicle plans to not yield to the person.

According to various embodiments, an autonomous vehicle comprises a vehicle propulsion system, a braking system, a computing system, a plurality of sensor systems that generate a plurality of sensor signals, and the notification system. The computing system is in communication with the vehicle propulsion system, the braking system, the plurality of sensor systems, and the notification system. The plurality of sensor signals are indicative of a person in a driving environment of the autonomous vehicle. In an example, the person may be a pedestrian in the driving environment, a driver of a vehicle in the driving environment, or a cyclist in the driving environment. When the person is a driver of a vehicle, the person in the vehicle need not be perceived by the autonomous vehicle; instead, the vehicle itself may be perceived in such a scenario. The notification system may include a lighting system or a sound system. The notification system may be incorporated into or mounted on the autonomous vehicle. For instance, the notification system may be incorporated into or mounted on a roof of the autonomous vehicle, a bottom of the autonomous vehicle, or a window of the autonomous vehicle, such as a front windshield of the autonomous vehicle, a back window of the autonomous vehicle, or a side window of the autonomous vehicle.

In operation, the autonomous vehicle is operating in the driving environment. The autonomous vehicle (by way of the computing system) determines that the autonomous vehicle is to execute a maneuver that will cause the autonomous vehicle to traverse a portion of the driving environment. In an example, the portion of the driving environment may be a crosswalk on a road or an intersection of two or more roads. The autonomous vehicle (by way of the computing system) also predicts that the person is to traverse the portion of the driving environment based upon the plurality of sensor signals. More specifically, the autonomous vehicle may predict that the person is to traverse the portion of the driving environment using a computer-implemented machine learning model that takes at least some of the plurality of sensor signals as input.

The computing system of the autonomous vehicle may then control the notification system of the autonomous vehicle to output at least one indicator that is perceivable external to the autonomous vehicle. In a first example, the at least one indicator may be a first indicator that indicates that the autonomous vehicle plans to execute the maneuver subsequent to the person traversing the portion of the driving environment (i.e., the autonomous vehicle plans to yield to the pedestrian). In the first example, the notification system may output the first indicator when the autonomous vehicle determines that the person is expected to fail to yield to the autonomous vehicle. The autonomous vehicle may base the determination based upon the plurality of sensor signals. After the person traverses the portion of the driving environment, the autonomous vehicle may control at least one of the vehicle propulsion system or the braking system to execute the maneuver.

In a second example, the at least one indicator may be a second indicator that indicates that the autonomous vehicle plans to execute the maneuver prior to the person traversing the portion of the driving environment (i.e. the pedestrian is expected to yield to the autonomous vehicle). In the second example, the autonomous vehicle may output the second indicator when the autonomous vehicle determines that the person is expected yield to the autonomous vehicle. The autonomous vehicle may base the determination based upon the plurality of sensor signals. The autonomous vehicle may then control at least one of the vehicle propulsion system or the braking system to execute the maneuver.

As noted above, the notification system may comprise a lighting system and/or a sound system. Thus, the at least one indicator may comprise a visual indicator and the lighting system may be configured to emit the visual indicator which is viewable external to the autonomous vehicle. The at least one indicator may also comprise an audible indicator and the sound system may be configured to emit the audible indicator which is perceivable external to the autonomous vehicle.

In an embodiment, the lighting system may emit the visual indicator with a first coloring when the autonomous vehicle plans to execute the maneuver subsequent to the person traversing the portion of the driving environment. The lighting system may emit the visual indicator with a second coloring when the autonomous vehicle plans to execute the maneuver prior to the person traversing the portion of the driving environment.

In an embodiment, the lighting system may emit the visual indicator at the portion of the driving environment, thereby visually highlighting the portion of the driving environment that the person is to traverse. In another embodiment, the lighting system may emit the visual indicator at the person.

In an embodiment, a type of indicator outputted by the notification system may be based upon characteristics of the driving environment of the autonomous vehicle. The autonomous vehicle may ascertain the characteristics based upon the plurality of sensor signals. The characteristics may include a time of day, weather conditions of the driving environment, a type of the person (e.g., pedestrian, cyclist, conventional vehicle operator, etc.).

The above-described technologies present various advantages over conventional technologies pertaining to autonomous vehicles. First, the above-described technologies enable an autonomous vehicle to mimic conventional intent signaling employed by drivers of conventional vehicles. Second, by utilizing a combination of visual indicators and audible indicators, the technologies described above enable the autonomous vehicle to more effectively convey intent to persons in the driving environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
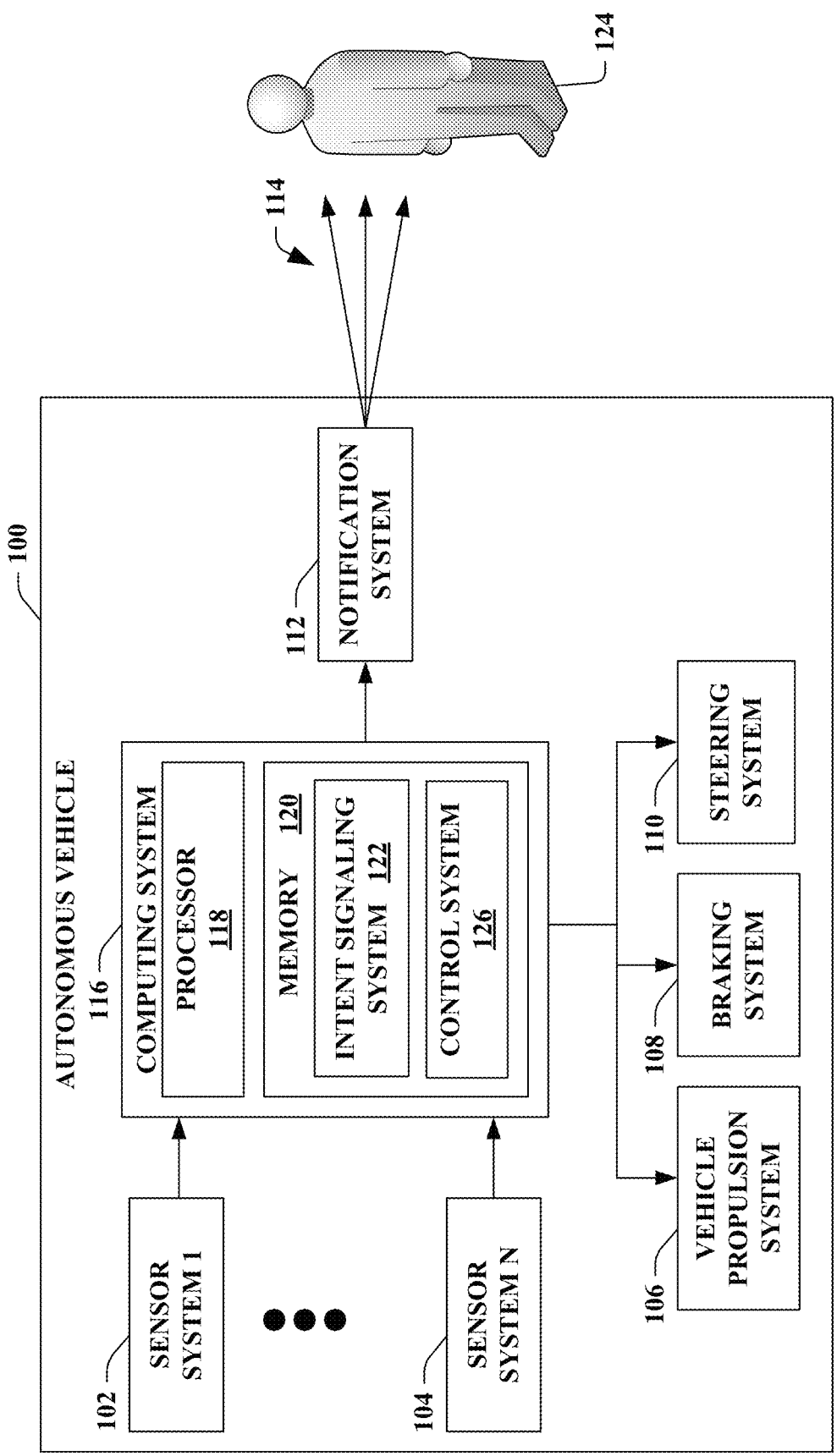
FIG. 1 illustrates a functional block diagram of an exemplary autonomous vehicle.

Various technologies pertaining to controlling an autonomous vehicle to provide an indicator, which is perceivable external to the autonomous vehicle, to signal intent of the autonomous vehicle to one or more persons in a driving environment of the autonomous vehicle, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an autonomous vehicle 100. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera sensor (image) system. Other exemplary sensor systems included in the sensor systems 102-104 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110. The vehicle propulsion system 106 may be an electric motor, an internal combustion engine, or a combination thereof. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 includes a notification system 112. The notification system 112 includes a hardware device (or a plurality of hardware devices) configured to output an indicator 114. The indicator 114 outputted by the notification system 112 is perceivable external to the autonomous vehicle 100. For example, the indicator 114 may be perceived by a person 124 in a driving environment of the autonomous vehicle 100. In an example, the person 124 may be a pedestrian, a driver of a conventional vehicle, or a cyclist. According to an example, the notification system 112 can include a lighting system that emits a visual indicator viewable external to the autonomous vehicle 100. Following this example, the lighting system can include a hardware device (or hardware devices) integrated into, mounted on, or otherwise physically coupled to the autonomous vehicle 100; the hardware device(s) of the lighting system can emit a visual indicator (e.g., the indicator 114), which can be or include light rays. According to yet another example, the notification system 112 can include a sound system that can emit an audible indicator perceivable external to the autonomous vehicle 100. Pursuant to this example, the sound system can include a hardware device (or hardware devices) integrated into, mounted on, or otherwise physically coupled to the autonomous vehicle 100; the hardware device(s) of the sound system can emit an audible indicator (e.g., the indicator 114), which can be or include sound waves. Further, it is contemplated that the notification system 112 can include both a lighting system and a sound system. Thus, the indicator 114 outputted by the notification system 112 can be a visual indicator, an audible indicator, or a combination thereof. Pursuant to an illustration in which the notification system 112 includes both a lighting system and a sound system, it is to be appreciated that the notification system 112 can concurrently emit a visual indicator and an audible indicator during a common time period (e.g., the indicator 114 can include the visual indicator and the audible indicator) or the notification system 112 can emit a visual indicator and an audible indicator during different time periods (e.g., the indicator 114 outputted during a particular time period can be one of the visual indicator or the audible indicator). As described in greater detail below, an intent signaling system 122, for instance, can cause the notification system 112 to emit either (or both) a visual indicator or an audible indicator based on characteristics of the driving environment such as time of day, location of the autonomous vehicle 100 within the driving environment, a type of the person 124, a combination thereof, or the like.

According to an example, the audible indicator emitted by the sound system of the notification system 112 can be a spoken word (or spoken words). Following this example, the spoken word(s) can signify to the person 124 (or others nearby the autonomous vehicle 100) whether or not the autonomous vehicle 100 plans to yield to the person 124. For instance, the spoken word(s) can be "Please proceed in front of vehicle" when the autonomous vehicle 100 plans to yield to the person 124, or the spoken word(s) can be "Caution—wait for vehicle to pass" when the person 124 is to yield to the autonomous vehicle 100. By way of another example, the audible indicator emitted by the sound system of the notification system 112 can be a sound other than spoken words. Pursuant to this example, the sound can be a chime that intuitively indicates to the person 124 whether or not to proceed (e.g., whether the autonomous vehicle 100 plans to yield or not yield to the person 124).

The autonomous vehicle 100 additionally includes a computing system 116 that is in communication with the sensor systems 102-104, the vehicle propulsion system 106, the braking system 108, the steering system 110, and the notification system 112. The computing system 116 includes a processor 118 and memory 120. The memory 120 includes computer-executable instructions that are executed by the processor 118. Pursuant to various examples, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 120 of the computing system 116 includes the intent signaling system 122 that is configured to control the notification system 112 of the autonomous vehicle 100 to output the indicator 114. As will be described in greater detail below, the intent signaling system 122 can control the indicator 114 outputted by the notification system 112 such that a characteristic of the indicator 114 is controlled based on one or more characteristics of a driving environment of the autonomous vehicle 100. According to an illustration, the intent signaling system 122 can cause the notification system 112 to emit a green light for the person 124 when the autonomous vehicle 100 plans to yield to the person 124, while the intent signaling system 122 can cause the notification system 112 to emit a red light for the person 124 when the autonomous vehicle 100 expects the person 124 to yield to the autonomous vehicle 100. Moreover, the intent signaling system 122 can modify the characteristic of the indicator 114 over time based on a state of the autonomous vehicle 100. For instance, the indicator 114 may have an intensity (e.g., a coloring intensity, a sound intensity, etc.) and the autonomous intent signaling system 122 can control the notification system 112 to vary the intensity (e.g., vary from a dull color to a bright color, vary from a low volume sound to a high volume sound) of the indicator 114 based upon a distance between the autonomous vehicle 100 and the person 124. Further, a characteristic of the indicator 114 outputted by the notification system 112 can be controlled by the intent signaling system 122 to signify that the indicator 114 is intended to be communicated to a particular person (e.g., the person 124) in the driving environment; for instance, the intent signaling system 122 can cause a direction of an emitted light outputted by the notification system 112 to be pointed at or near the particular person (e.g., a crosswalk can be illuminated when the autonomous vehicle 114 plans to yield to the particular person crossing a street in the crosswalk).

In an embodiment, the intent signaling system 122 can cause the notification system 112 to emit a first type of indicator for a first type of person and a second type of indicator for a second type of person. For instance, the first type of indicator may be a visual indicator of a first color for the first type of person and the second type of indicator may be a visual indicator of a second color for the second type of person. A type of person may be, but is not limited to, a pedestrian, a driver of a vehicle, or a cyclist. When the person 124 is a driver of a vehicle, the person 124 in the vehicle need not be perceived by the autonomous vehicle 100; instead, the vehicle itself may be perceived by the autonomous vehicle 100 in such a scenario.

The memory 120 additionally includes a control system 126. The control system 126 is configured to control at least one of the mechanical systems of the autonomous vehicle 100 (e.g., at least one of the vehicle propulsion system 106, the braking system 108, and/or the steering system 110). Moreover, the control system 126 can be configured to provide data corresponding to the control of the mechanical system(s) to the intent signaling system 122. For instance, the control system 126 can provide data to the intent signaling system 122 specifying the state of the autonomous vehicle 100. Thus, the intent signaling system 122 can control the notification system 112 to output the indicator 114 based on the data corresponding to the control of the mechanical system(s) received from the control system 126.

Figure 2:
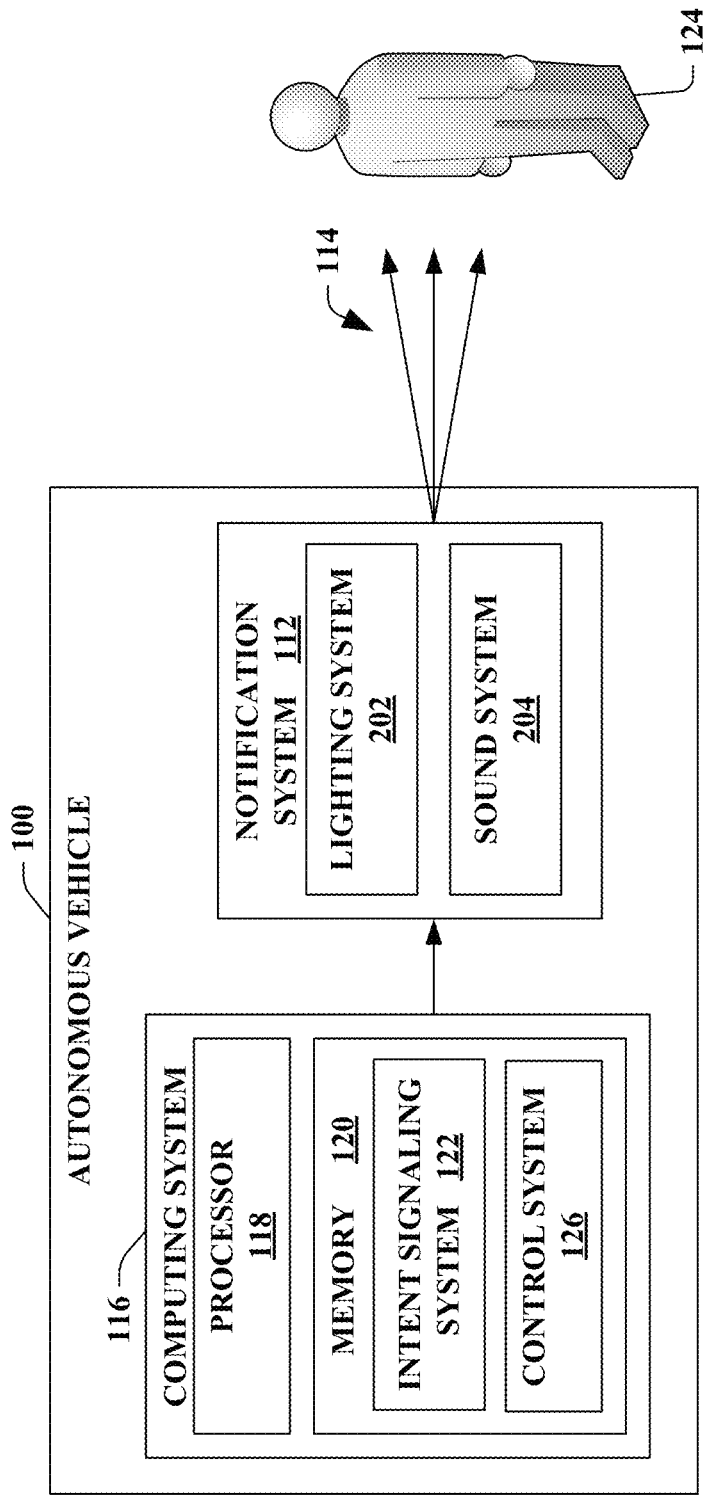
FIG. 2 illustrates a functional block diagram of an exemplary autonomous vehicle.

Now turning to FIG. 2, illustrated is the autonomous vehicle 100 in accordance with various embodiments. Again, the autonomous vehicle 100 includes the computing system 116 and the notification system 112. While not shown, it is to be appreciated that the autonomous vehicle 100 further includes the sensor systems 102-104 and the mechanical systems as described herein. As depicted in FIG. 2, the notification system 112 can include a lighting system 202 and a sound system 204; thus, the intent signaling system 122 can control the lighting system 202 and/or the sound system 204 to output the indicator 114.

According to an example, the intent signaling system 122 can cause the lighting system 202 to emit a visual indicator viewable external to the autonomous vehicle 100. It is contemplated that the visual indicator can be displayed on the autonomous vehicle 100 (or a portion thereof) and/or nearby the autonomous vehicle 100 (e.g., the visual indicator can be projected by the lighting system 202 onto the ground nearby the autonomous vehicle 100, at the person 124, etc.).

The lighting system 202 can include substantially any number of lights that can be incorporated into or mounted upon the autonomous vehicle 100. The lights of the lighting system 202 can include substantially any type of lights (e.g., the lighting system 202 can include various light emitting diodes (LEDs)). It is contemplated that a subset of the lights of the lighting system 202 can emit the visual indicator at a given time, while a remainder of the lights of the lighting system 202 need not be illuminated (e.g., a light bar on one door of the autonomous vehicle 100 can be illuminated while a light bar on a differing door is not illuminated). The lights of the lighting system 202 can be color addressable. Moreover, according to an example, the lights of the lighting system 202 can emit light in a controllable direction from the autonomous vehicle 100. Further, is to be appreciated that the lights of the lighting system 202 can be located at substantially any location on the autonomous vehicle 100 (e.g., on a top of the autonomous vehicle 100 around a lidar sensor system, underneath the autonomous vehicle 100, on doors of the autonomous vehicle 100, on a front or rear bumper of the autonomous vehicle 100, on windows of the autonomous vehicle 100, on trim surrounding doors and/or windows of the autonomous vehicle 100).

Pursuant to an example, a characteristic of the visual indicator can be a color of the visual indicator. According to an illustration, the intent signaling system 122 can cause the lighting system 202 to emit the visual indicator in a first color (e.g., green) when the autonomous vehicle 100 plans to yield to the person 124 and in a second color (e.g., red) when the autonomous vehicle 100 plans to not yield to the person 124.

Pursuant to another example, the characteristic of the visual indicator can be an animation. According to an illustration, the predefined animation outputted by the lighting system 202 can include marching green ants depicted to be marching around the autonomous vehicle 100 when the autonomous vehicle 100 is yielding or plans to yield to the person 124.

In an embodiment, the lighting system 202 may be mounted underneath the autonomous vehicle 100. In the embodiment, the lighting system 202 may include at least one light strip that extends across the perimeter of the bottom of the autonomous vehicle 100. For instance, the at least one light strip may include a first light strip that extends from a bottom front right portion of the autonomous vehicle 100 to a bottom front left portion of the autonomous vehicle 100, a second light strip that extends from a bottom back right potion of the autonomous vehicle 100 to a bottom back left portion of the autonomous vehicle 100, a third light strip that extends from a bottom front right portion of the autonomous vehicle 100 to a bottom back right portion of the autonomous vehicle 100, and a fourth light strip that extends from a bottom front left portion of the autonomous vehicle 100 to a bottom back left portion of the autonomous vehicle 100. It is contemplated that the foregoing light strips can extend across an entire width or length of the autonomous vehicle 100. Alternatively, the light strips noted above can extend across a portion of the width or a portion of the length of the autonomous vehicle 100.

In an embodiment, the lighting system 202 may include articulating (i.e., orientable) light sources that be configured to emit the visual indicator at different areas around the driving environment. For instance, the lighting system 202 may cause the visual indicator to be emitted at the person 124 and/or at a portion of the driving environment that the person 124 is to traverse. Moreover, the lighting system 202 may be configured to continually emit the visual indicator at the person 124 as the person traverses the driving environment of the autonomous vehicle 100.

Moreover, as noted above, the notification system 112 can include the sound system 204. The sound system 204 can include substantially any number of speakers. The sound system 204 may be placed on any location of the autonomous vehicle 100. The intent signaling system 122 can cause the sound system 204 to emit an audible indicator perceivable external to the autonomous vehicle 100. A characteristic of the audible indicator can be controlled by the intent signaling system 122. For instance, the intent signaling system 122 may cause the notification system 112 to emit the audible indicator as a first sound when the autonomous vehicle 100 plans to execute the maneuver subsequent to the person 124 traversing a portion of the driving environment. The intent signaling system 122 may cause the notification system 112 to emit the audible indicator as a second sound when the autonomous vehicle 100 plans to execute the maneuver prior to the person 124 traversing the portion the driving environment.

Figure 3:
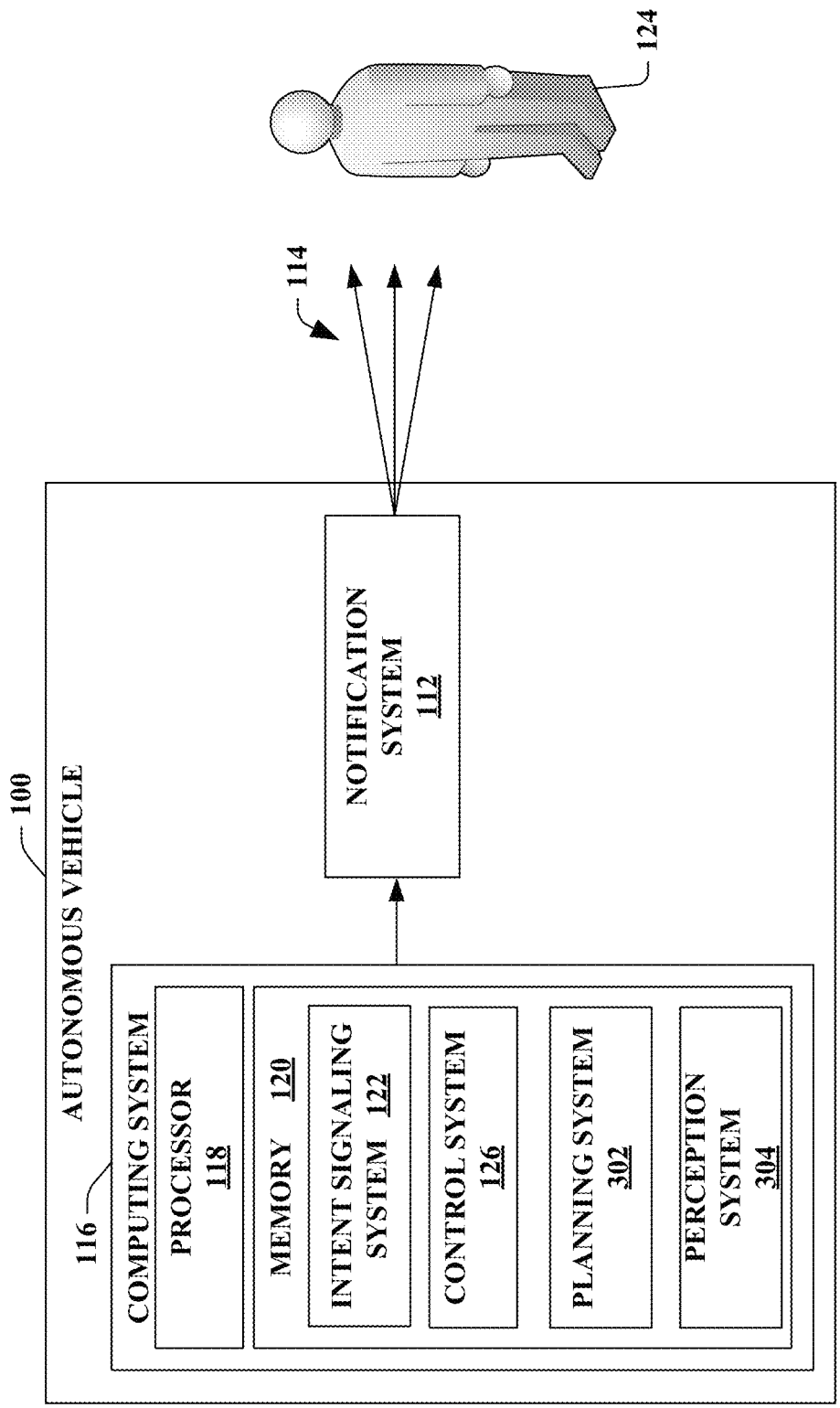
FIG. 3 illustrates a functional block diagram of an exemplary autonomous vehicle.

With reference to FIG. 3, illustrated is the autonomous vehicle 100 in accordance with various embodiments. Again, the autonomous vehicle 100 includes the computing system 116 and the notification system 112. While not shown, it is to be appreciated that the autonomous vehicle 100 further includes the sensor systems 102-104 and the mechanical systems as described herein. In accordance with various embodiments, the memory 120 of the computing system 116 includes a planning system 302 and a perception system 304. The planning system 302 is configured to plan a route that the autonomous vehicle 100 is to follow. For instance, the planning system 302 may plan a series of maneuvers that are to be performed by the autonomous vehicle 100. Generally speaking, the perception system 304 is configured to track objects (e.g., vehicles, people, etc.) in the driving environment surrounding the autonomous vehicle 100.

Figure 4:
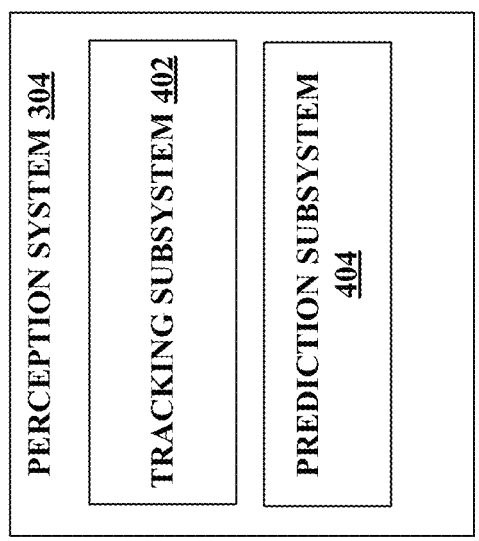
FIG. 4 illustrates a functional block diagram of an exemplary perception system of an autonomous vehicle.

Referring now to FIG. 4, a functional block diagram of the perception system 304 is illustrated. The perception system 304 may include a tracking subsystem 402 and a prediction subsystem 404. The tracking subsystem 402 is configured to track objects surrounding the autonomous vehicle 100. As such, the tracking subsystem 402 may be configured to interact with the plurality of sensor systems 102-104 in order to effectuate the tracking. In an example, when the plurality of sensor systems 102-104 include articulating (i.e., orientable) sensors, the tracking subsystem 402 may be configured to cause the articulating sensors to remain directed at objects in the driving environment of the autonomous vehicle 100 as the autonomous vehicle 100 is moving. In another example, the tracking subsystem 402 may be configured to control sensor systems in the plurality of sensor systems 102-104 such that objects remain tracked.

The prediction subsystem 404 is configured to predict future paths of objects (e.g., vehicles, people, etc.) in the driving environment based on sensor signals generated by the plurality of sensor systems 102-104. The prediction subsystem 404 may utilize computer-implemented machine learning models, such as a deep neural network (DNN), in order to predict the future paths. In an example, the prediction subsystem 404 may predict future paths of the objects for a period of time ranging from 10-12 seconds.

In an embodiment where the indicator 114 is a visual indicator, the tracking subsystem 402 and the prediction subsystem 404 may work in conjunction with one another in order to determine where to direct the visual indicator in the driving environment. For instance, the tracking subsystem 402 and the prediction subsystem 404 may utilize quaternion transforms in order to facilitate directing the visual indicator at the person 124 in the driving environment.

In an embodiment, the perception system 304 may be configured to assign labels to objects (in proximity to the autonomous vehicle 100) captured in sensor signals output by the sensor systems 102-104. These predefined types of objects can include, but are not limited to, pedestrian, bike, car, truck, bus, and static (unknown), where the type "static" can represent telephone poles, construction equipment, etc.).

With reference generally now to FIGS. 1-4, exemplary operation of the autonomous vehicle 100 is set forth. It is contemplated that the autonomous vehicle 100 is operating in a driving environment. The computing system 116 of the autonomous vehicle 100 determines that the autonomous vehicle 100 is to execute a maneuver that will cause the autonomous vehicle 100 to traverse a portion of the driving environment. In a non-limiting example, the portion of the driving environment may be a crosswalk on a road or an intersection of two or more roads. The computing system 116 also predicts that a person 124 is to traverse the portion of the driving environment based upon a plurality of sensor signals generated by the plurality of sensor systems 102-104. More specifically, the computing system 116 may predict that the person 124 is to traverse the portion of the driving environment using a computer-implemented machine learning model that takes at least some of the plurality of sensor signals as input.

The computing system 116 of the autonomous vehicle 100 may then control the notification system 112 of the autonomous vehicle 100 to output the indicator 114 that is perceivable external to the autonomous vehicle 100. In a first example, the indicator 114 may be a first indicator that indicates that the autonomous vehicle 100 plans to execute the maneuver subsequent to the person 124 traversing the portion of the driving environment (i.e., the autonomous vehicle 100 plans to yield to the pedestrian). In the first example, the notification system 112 may output the first indicator when the computing system 116 determines that the person 124 is expected to fail to yield to the autonomous vehicle 100. The autonomous vehicle 100 may then yield to the person 124. After the person 124 traverses the portion of the driving environment, the autonomous vehicle 100 may control at least one of the vehicle propulsion system 106, the braking system 108, or the steering system 100 to execute the maneuver.

In a second example, the indicator 114 may be a second indicator that indicates that the autonomous vehicle 100 plans to execute the maneuver prior to the person 124 traversing the portion of the driving environment (i.e. the pedestrian 124 is expected to yield to the autonomous vehicle 100). In the second example, the computing system 116 controls the notification system 112 to output the second indicator when the computing system 116 determines that the person 124 is expected yield to the autonomous vehicle 100. The autonomous vehicle 100 may control at least one of the vehicle propulsion system 106, the braking system 108, or the steering system 100 to execute the maneuver. Subsequently, it is contemplated that the person 124 will then traverse the portion of the driving environment.

In an embodiment, the computing system 116 may control the notification system 112 to output the first indicator for a first duration of time during which the person 124 traverses the portion of the driving environment. In the embodiment, the computing system 116 may control the notification system 112 to output the second indicator for a second duration of time during which the autonomous vehicle 100 traverses the portion of the driving environment.

Figure 5A:
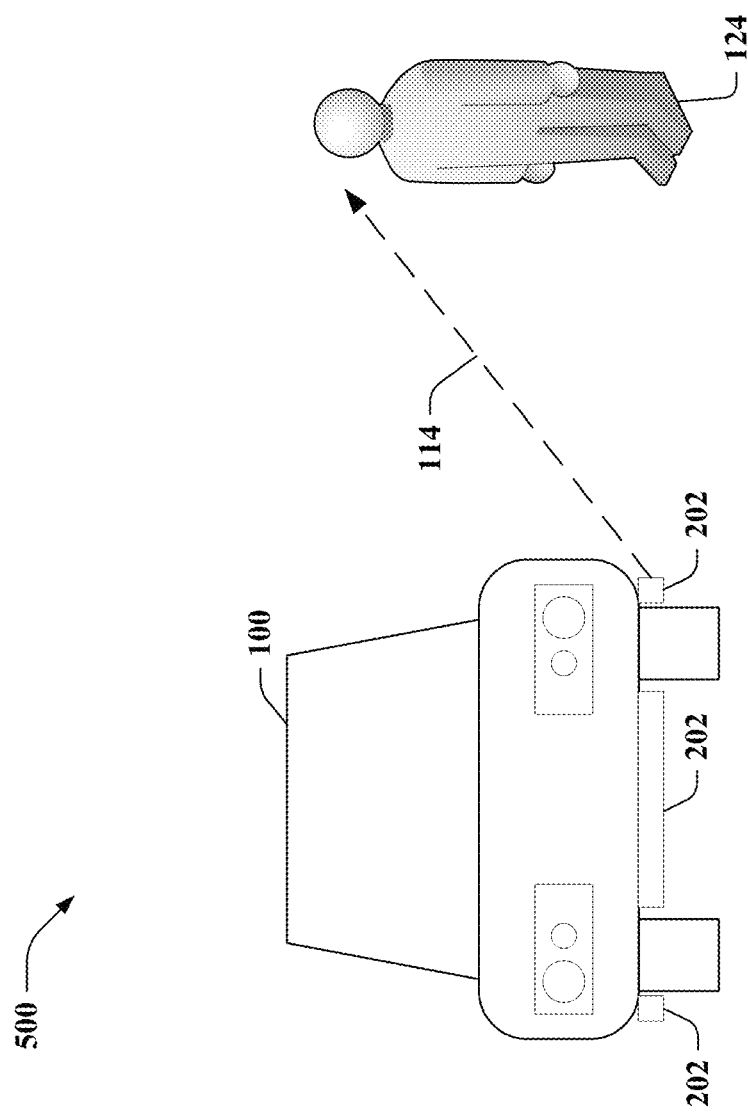
FIGS. 5A and 5B illustrate exemplary placements of a notification system (e.g., a lighting system) on an autonomous vehicle.
Figure 5B:
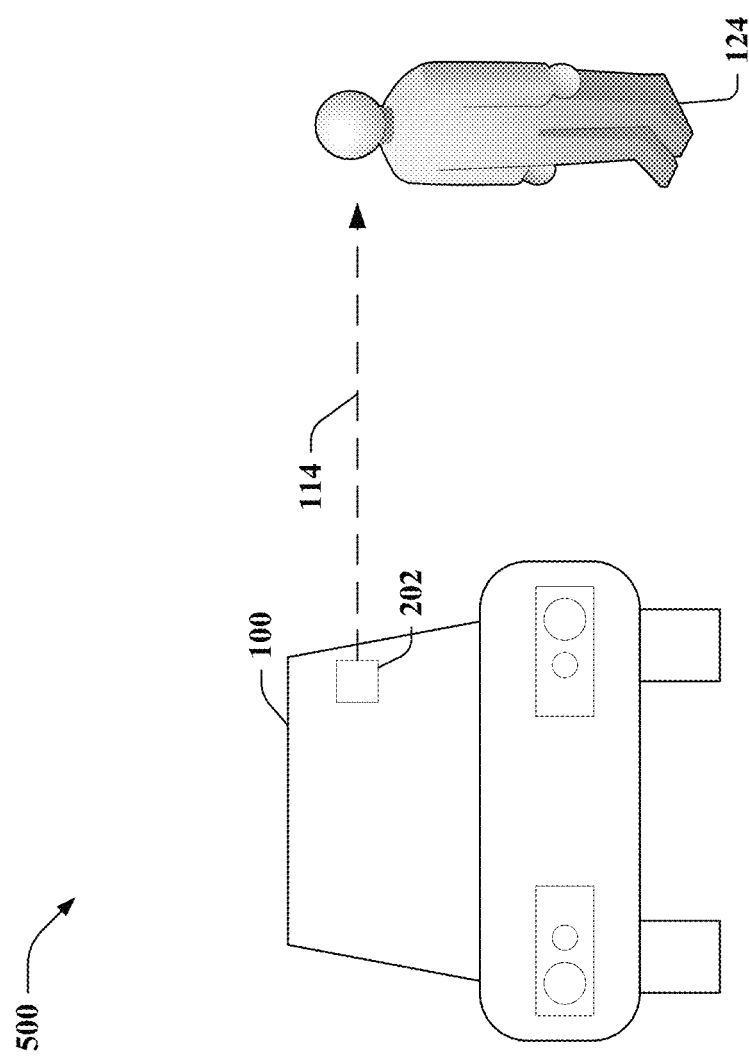

Now turning to FIGS. 5A and 5B, front-views of the autonomous vehicle 100 depicting exemplary placement of a notification system (e.g., the notification system 112) on the autonomous vehicle 100 are illustrated. As shown in FIG. 5A, the notification system includes the lighting system 202. In the depicted example of FIG. 5A, the lighting system 202 is mounted underneath the autonomous vehicle 100. The lighting system 202 can include a plurality of light strips that can be controlled to emit the indicator 114. Thus, in the example shown in FIG. 5A, the indicator 114 may be emitted from a one of the light strips mounted underneath the autonomous vehicle 124; the light strip from which the indicator 114 is emitted (or a portion thereof) can be controlled based on the location of the person 124.

According to another embodiment, as shown in FIG. 5B, the lighting system 202 can be mounted on a front end of the autonomous vehicle on or near a front windshield of the autonomous vehicle 100. More specifically, as depicted in FIG. 5B, the lighting system 202 can include lights (e.g., LEDs) mounted on or incorporated into the autonomous vehicle 100 on a driver side of the windshield (i.e., near where a driver of a conventional vehicle would be expected to sit). In this embodiment, the indicator 114 can be emitted from the lighting system 202 (e.g., one or more lights of the lighting system 202) from a location on the autonomous vehicle 100 where the person 124 would expect a driver of a conventional vehicle to be located.

Figure 6:
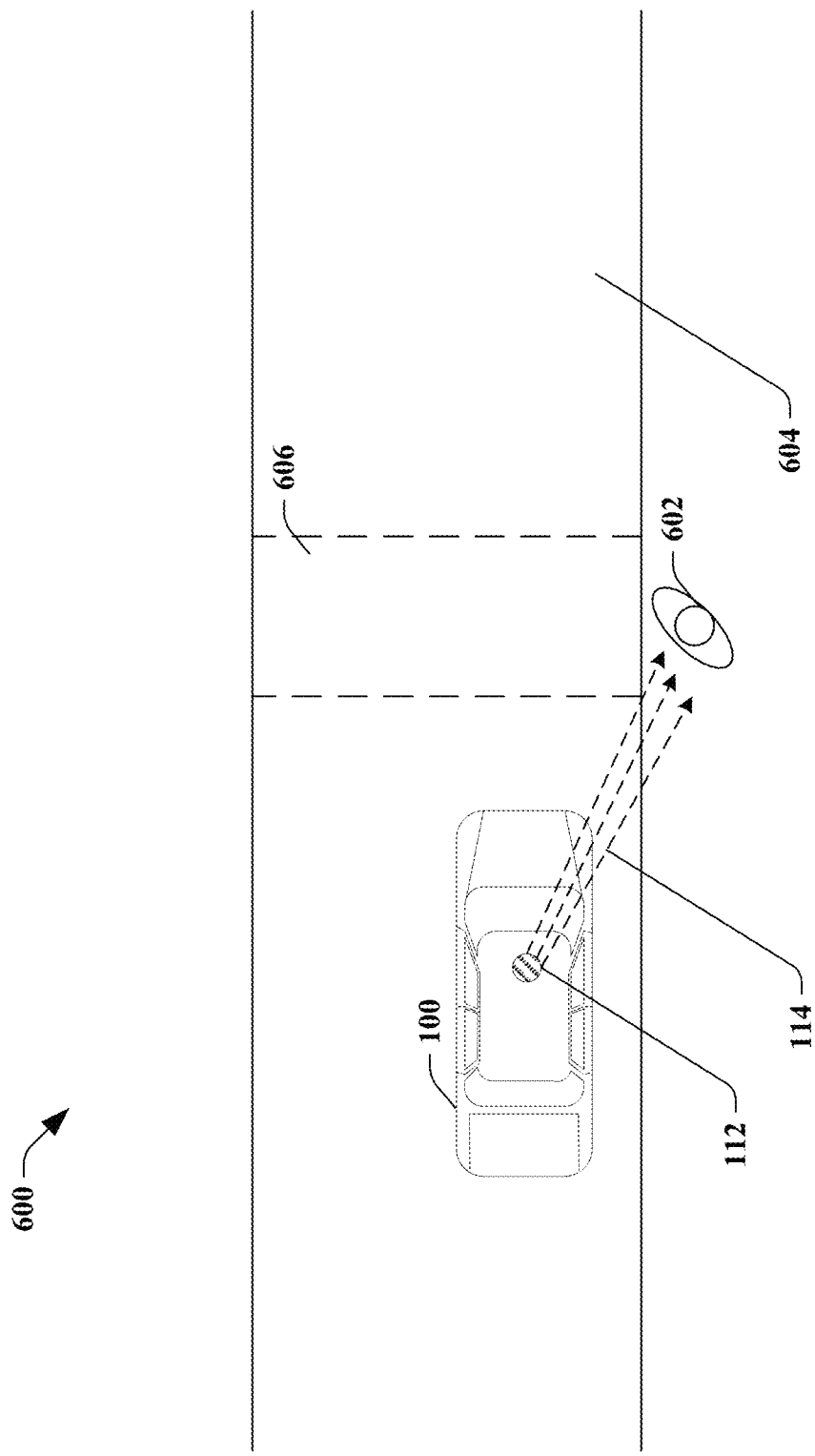
FIG. 6 illustrates an exemplary driving environment of an autonomous vehicle that includes a pedestrian.

Referring now to FIG. 6, an exemplary driving environment 600 that includes the autonomous vehicle 100 and a pedestrian 602 is illustrated. The pedestrian 602 may be the person 124. The driving environment 600 includes a road 604 that includes a crosswalk 606. In an example, the pedestrian 602 is to traverse the crosswalk 606 to cross the road 604. As described above, the autonomous vehicle 100 determines that the autonomous vehicle 100 is to execute a maneuver (i.e., going straight on the road 604) that will cause the autonomous vehicle 100 to traverse a portion of the driving environment 600 (i.e., the crosswalk 606). The autonomous vehicle 100 also predicts that the pedestrian 602 is to traverse the crosswalk 606 based upon a plurality of sensor signals generated by the sensor systems 102-104. The autonomous vehicle 100 then controls the notification system 112 to output the indicator 114 at the pedestrian 602 such that the indicator 114 is perceivable by the pedestrian 602. In an example, the indicator 114 indicates that the autonomous vehicle 100 is aware of the pedestrian 602 and that autonomous vehicle 100 plans to yield to the pedestrian 602 allowing the pedestrian 602 to traverse the crosswalk 606 prior to the autonomous vehicle 100 traversing the crosswalk. The pedestrian 600 may then traverse the crosswalk 606. Subsequently, the autonomous vehicle 100 may then continue heading straight on the road 604 thereby (perpendicularly) traversing the crosswalk 606.

Although the previously described scenario has been described as involving the crosswalk 606, it is understood that the autonomous vehicle 100 may also output the indicator 114 to pedestrians crossing the road 604 at areas other than the crosswalk 606.

Figure 7:
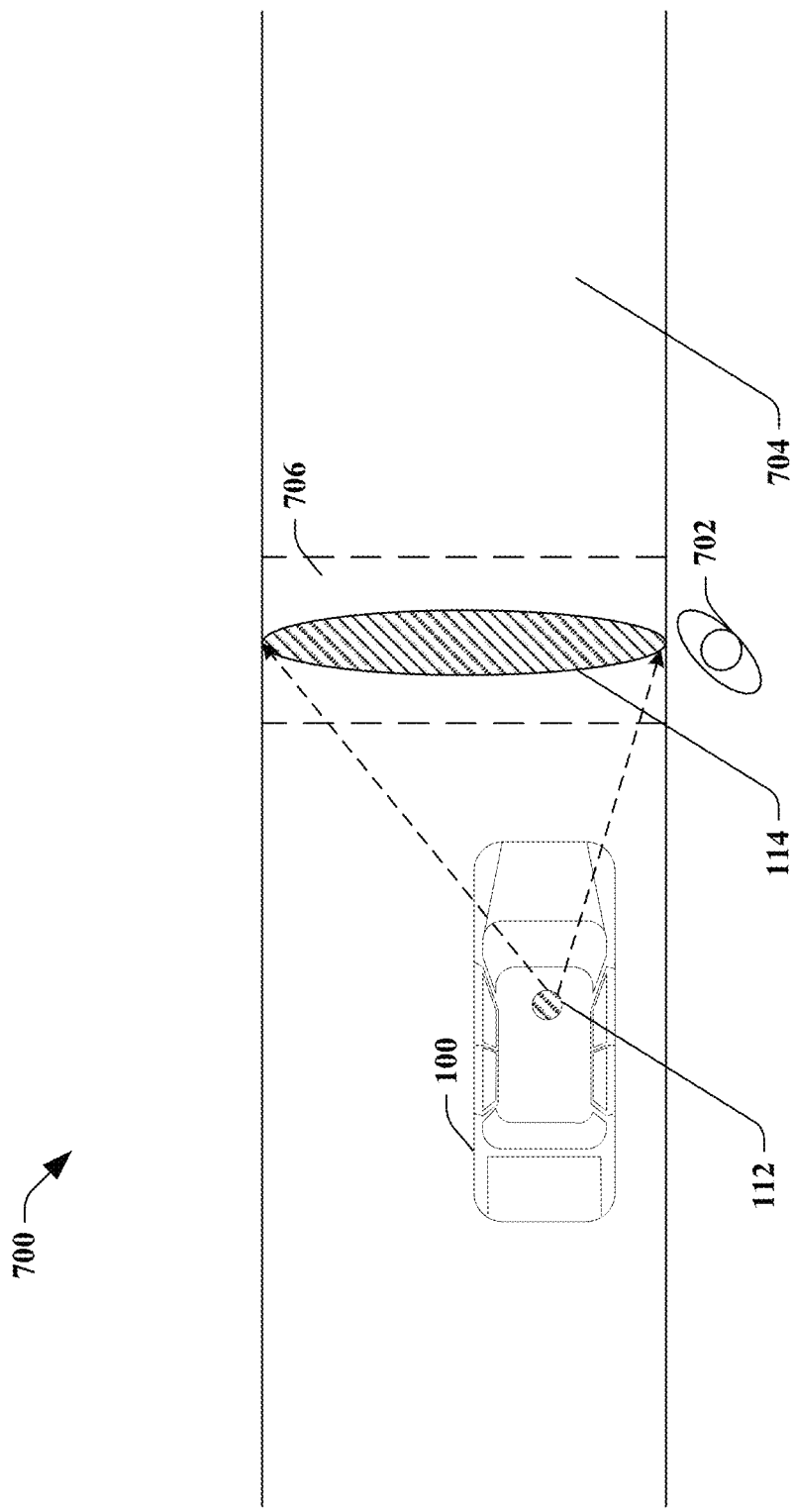
FIG. 7 illustrates another exemplary driving environment of an autonomous vehicle that includes a pedestrian.

With reference to FIG. 7, an exemplary driving environment 700 that includes the autonomous vehicle 100 and a pedestrian 702 is illustrated. The pedestrian 702 may be the person 124. The driving environment 700 includes a road 704 that includes a crosswalk 706. In an example, the pedestrian 702 is to traverse the crosswalk 706 in order to cross the road 704. As described above, the autonomous vehicle 100 determines that the autonomous vehicle 100 is to execute a maneuver (i.e., going straight on the road 704) that will cause the autonomous vehicle 100 to traverse a portion of the driving environment 700 (i.e., the crosswalk 706). The autonomous vehicle 100 also predicts that the pedestrian 702 is to traverse the crosswalk 706 based upon a plurality of sensor signals generated by the sensor systems 102-104. The autonomous vehicle 100 then controls the notification system 112 to output the indicator 114 at the crosswalk 706. For instance, the indicator 114 may be a visual indicator that is emitted at the crosswalk 706 such that the crosswalk 706 is illuminated in the driving environment 700, thereby indicating that the autonomous vehicle 100 is yielding to the pedestrian 700. The pedestrian 700 may then traverse the crosswalk 706. Subsequently, the autonomous vehicle 100 may then continue heading straight on the road 704 thereby (perpendicularly) traversing the crosswalk 706.

Figure 8:
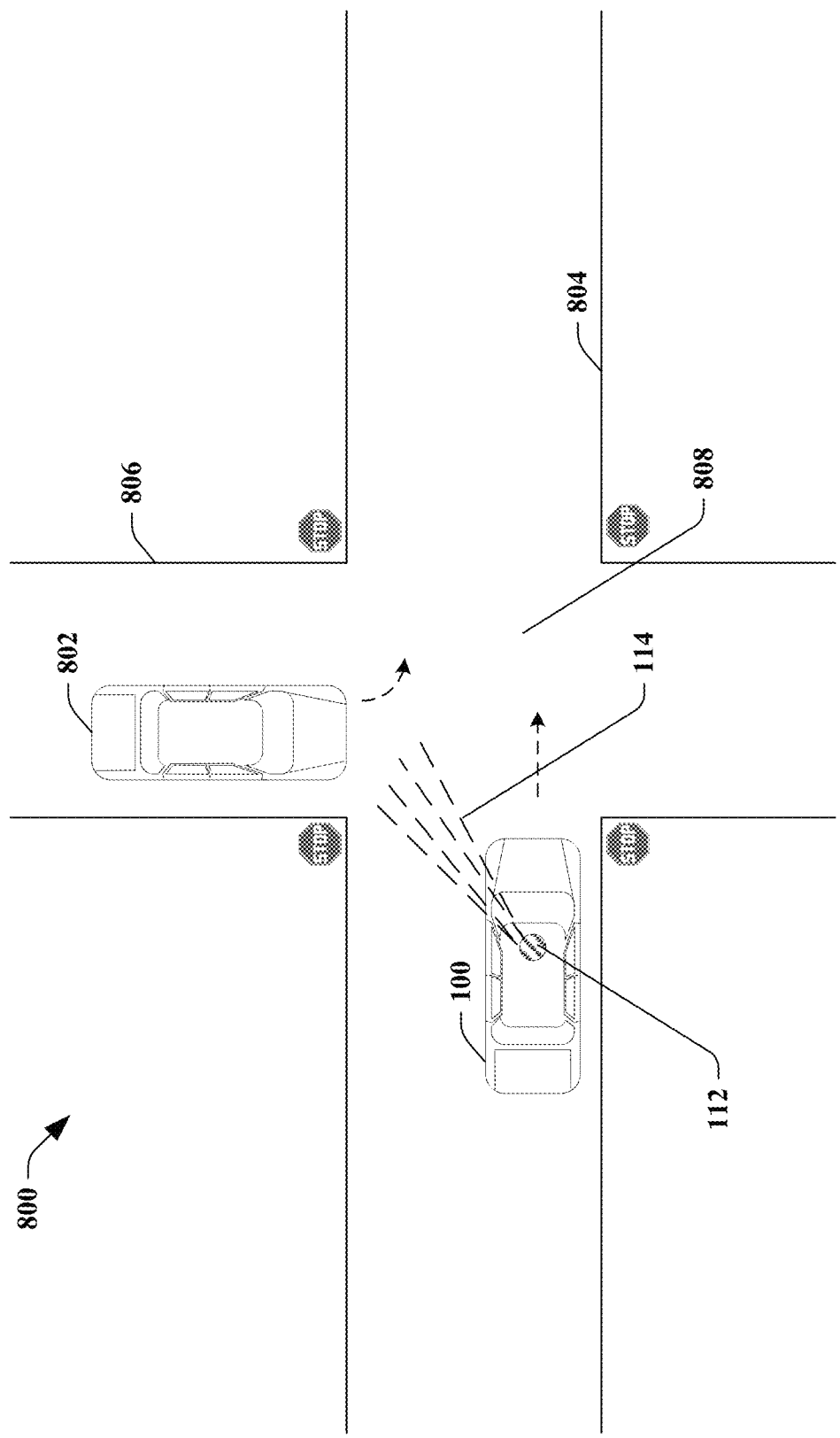
FIG. 8 illustrates an exemplary driving environment of an autonomous vehicle that includes an intersection and another vehicle.

Turning now to FIG. 8, an exemplary driving environment 800 that includes the autonomous vehicle 100 and a vehicle 802 operated by the person 124 is illustrated. The driving environment 800 includes a first road 804 and a second road 806 that intersect at an intersection 808 with stop signs. The autonomous vehicle 100 is operating on the first road 804 and the vehicle 802 is operating on the second road 806. It is contemplated that the autonomous vehicle 100 and the vehicle 802 arrive at the intersection 808 at a similar time such that it is ambiguous as to which vehicle arrived at the intersection 808 first. In an example, the autonomous vehicle 100 is to execute a maneuver (i.e., maintaining a straight heading on the first road 804) that will cause the autonomous vehicle 100 to traverse a portion of the driving environment 800 (i.e., the intersection 808). In the example, the autonomous vehicle 100 predicts that the vehicle 802 is also to traverse the intersection 808 (by making a left-turn at the intersection 808).

The autonomous vehicle 100 may then control the notification system 112 to output the indicator 114. When the autonomous vehicle 100 will yield to the vehicle 802, the indicator 114 indicates that the autonomous vehicle 100 plans to execute the maneuver subsequent to the vehicle 802 traversing the intersection 808. When the autonomous vehicle 100 expects the vehicle 802 to yield to the autonomous vehicle 100, the indicator 114 indicates that that the autonomous vehicle 100 plans to execute the maneuver prior to the vehicle 802 traversing the intersection 808.

Figure 9:
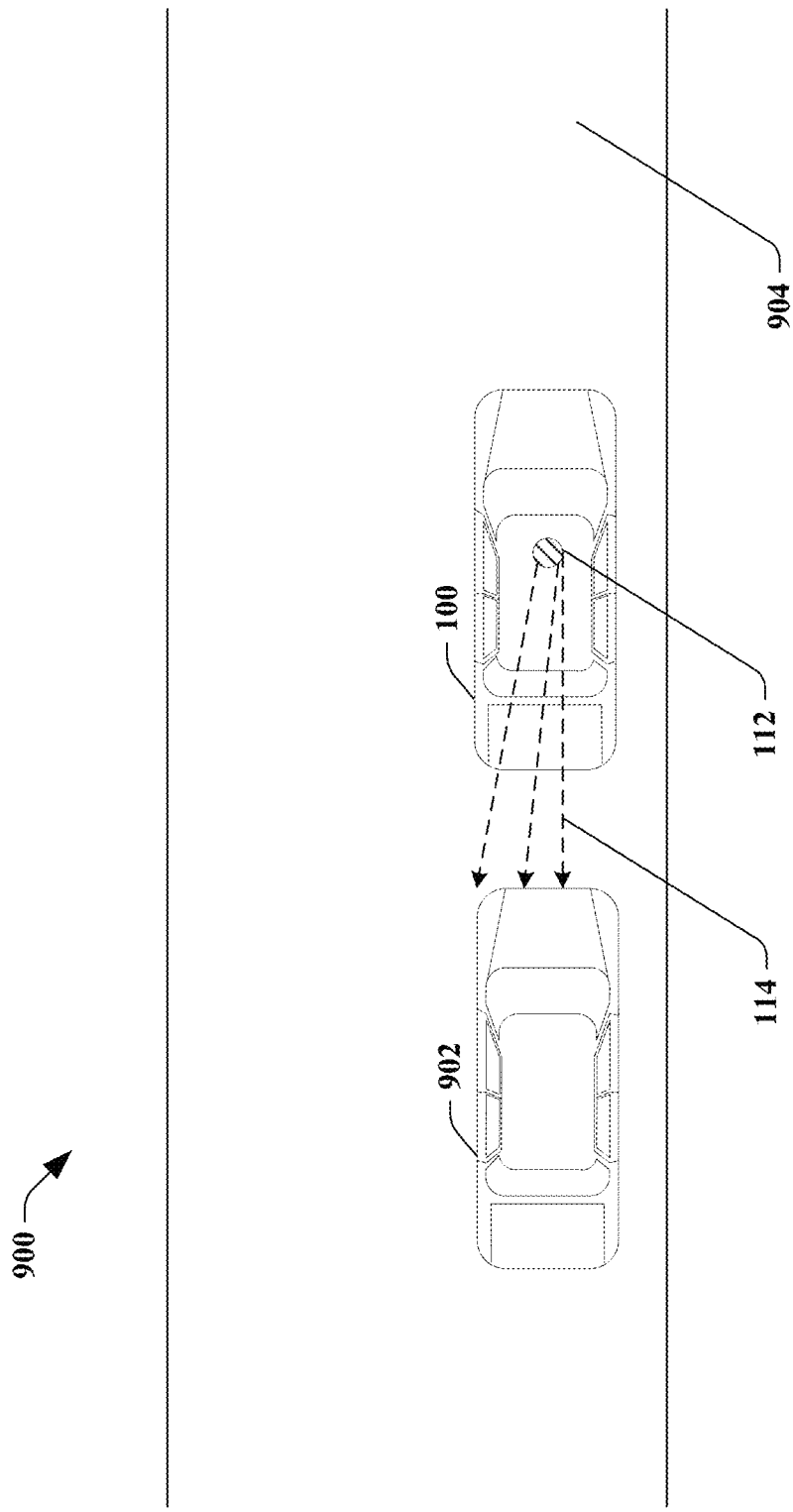
FIG. 9 illustrates an exemplary driving environment of an autonomous vehicle that includes another vehicle.

Referring now to FIG. 9, an exemplary driving environment 900 that includes the autonomous vehicle 100 and a vehicle 902 operated by the person 124 is illustrated. In the driving environment 900, the autonomous vehicle 100 is temporarily stopped at a position on a road 904 and the vehicle 902 is located behind the autonomous vehicle 100. For instance, the autonomous vehicle 100 may be temporarily stopped for passenger drop-off or pick-up. The autonomous vehicle 100 may detect the vehicle 902 based upon sensor signals generated by the plurality of sensor systems 102-104. The autonomous vehicle 100 may then control the notification system 112 to output the indicator 114, wherein the indicator 114 indicates that the vehicle 902 should maneuver around the autonomous vehicle 100.

Although the previously described scenario has been described as including a four-way intersection, it is to be appreciated that a similar process may be utilized in different types of intersections (e.g., a three-way intersection, a five-way intersection, etc.)

While the above-described processes have been described as involving a single person, it is to be understood that above-described process may be employed for many different persons in the driving environment of the autonomous vehicle 100. Moreover, the many different persons may be of different types (e.g., pedestrians, conventional vehicle drivers, cyclists, etc.).

While the above-described processes have been described as involving pedestrians, intersections, and vehicle passing, other possibilities are contemplated. For instance, the above-described processes may also be used to signal that a door of the autonomous vehicle 100 will be opened. Additionally, the above-described processes may be used to display intent of the autonomous vehicle 100 during a left turn.

Figure 10:
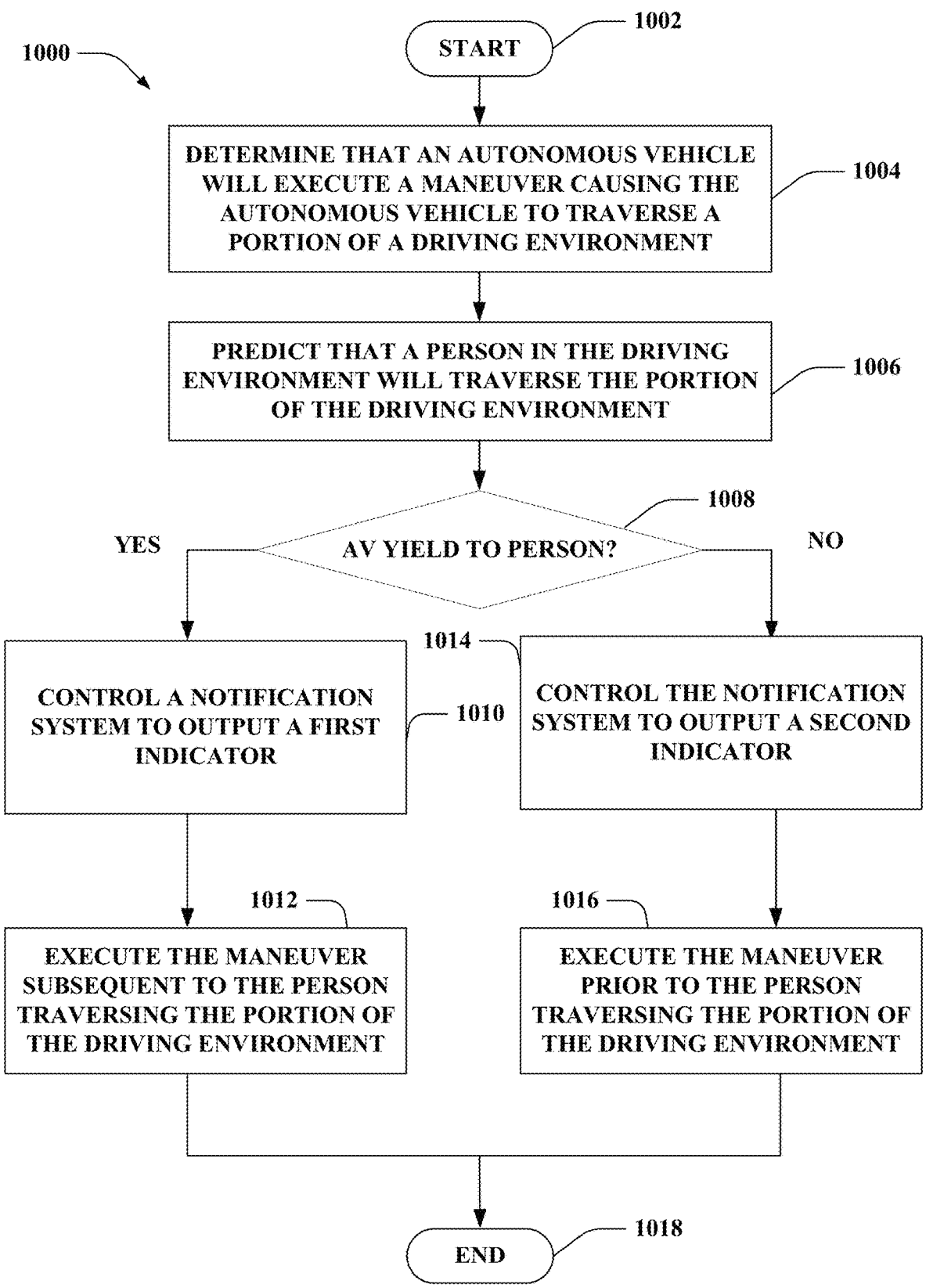
FIG. 10 is a flow diagram that illustrates an exemplary methodology performed by an autonomous vehicle to provide an indicator to signal autonomous vehicle intent.
Figure 11:
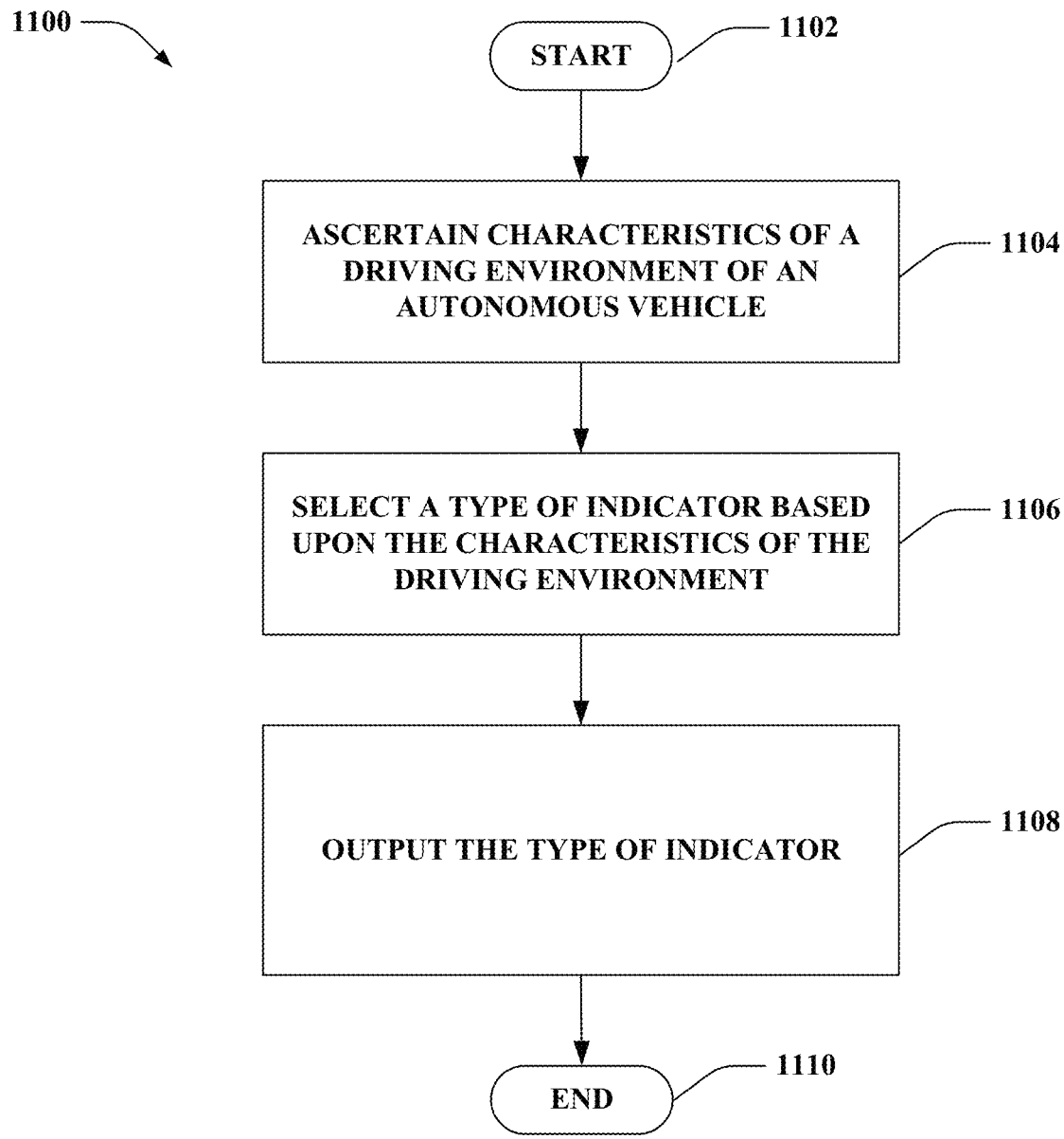
FIG. 11 is a flow diagram that illustrates another exemplary methodology performed by an autonomous vehicle to select a type of indicator that is to be provided by the autonomous vehicle.

FIGS. 10 and 11 illustrate exemplary methodologies relating to controlling an autonomous vehicle to provide an indicator signal intent of the autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 10, a methodology 1000 performed by an autonomous vehicle to provide an indicator indicative of autonomous vehicle intent is illustrated. The methodology 1000 begins at 1002, and at 1004, the autonomous vehicle determines that the autonomous vehicle is to execute a maneuver that will cause the autonomous vehicle to traverse a portion of a driving environment of the autonomous vehicle. At 1006, the autonomous vehicle predicts that a person in the driving environment of the autonomous vehicle is to traverse the portion of the driving environment based upon sensor signals generated by a plurality of sensor systems of the autonomous vehicle. At 1008, the autonomous vehicle determines whether the autonomous vehicle is to yield to the person when the person traverses the portion of the driving environment.

When the autonomous vehicle is to yield to the person (as determined at 1008), the methodology 1000 continues to 1010. At 1010, the autonomous vehicle controls a notification system of the autonomous vehicle to output a first indicator perceivable external to the autonomous vehicle. The first indicator may indicate that the autonomous vehicle plans to execute the maneuver subsequent to the person traversing the portion of the driving environment (i.e., the autonomous vehicle will yield to the person). Moreover, at 1012, the autonomous vehicle controls at least one of a vehicle propulsion system of the autonomous vehicle or a braking system of the autonomous vehicle to execute the maneuver subsequent to the person traversing the portion of the driving environment. The methodology 1000 can then conclude at 1018.

Alternatively, when the person is to yield to the autonomous vehicle (as determined at 1008), the methodology 1000 continues to 1014. At 1014, the autonomous vehicle controls the notification system of the autonomous vehicle to output a second indicator perceivable external to the autonomous vehicle. The second indicator may indicate that the autonomous vehicle plans to execute the maneuver prior to the person traversing the portion of the driving environment (i.e., signifying that the person is to yield to the autonomous vehicle). At 1016, the autonomous vehicle controls at least one of the vehicle propulsion system or the braking system to execute the maneuver prior to the person traversing the portion of the driving environment. The methodology 1000 can then conclude at 1018.

Turning to FIG. 11, a methodology 1100 performed by an autonomous vehicle to provide an indicator of a given type is illustrated. The methodology 1100 begins at 1102, and at 1104, the autonomous vehicle ascertains characteristics of a driving environment of the autonomous vehicle based upon sensor signals generated by sensor systems of the autonomous vehicle. At 1106, the autonomous vehicle selects a type of indicator that is to be outputted based upon the characteristics of the driving environment. At 1108, the autonomous vehicle (by way of a notification system) outputs the type of indicator. The methodology 1100 concludes at 1110.

Figure 12:
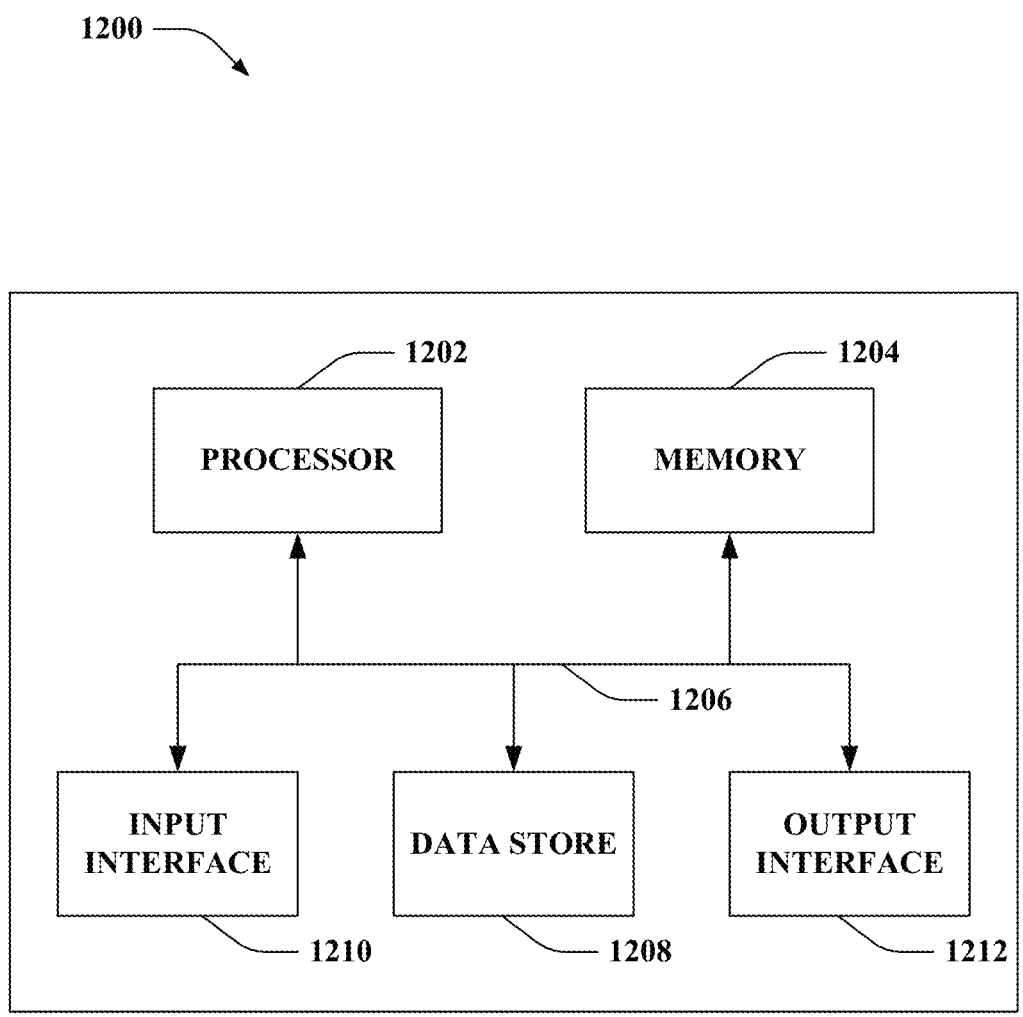
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be or include the computing system 116. The computing device 1200 includes at least one processor 1202 that executes instructions that are stored in a memory 1204. The instructions may be, for instance, instructions for implementing functionality described as being carried out by one or more systems discussed above or instructions for implementing one or more of the methods described above. The processor 1202 may be a GPU, a plurality of GPUs, a CPU, a plurality of CPUs, a multi-core processor, etc. The processor 1202 may access the memory 1204 by way of a system bus 1206. In addition to storing executable instructions, the memory 1204 may also store data specifying characteristics of indicators, computer-implemented machine learning models, and so forth.

The computing device 1200 additionally includes a data store 1208 that is accessible by the processor 1202 by way of the system bus 1206. The data store 1208 may include executable instructions, data specifying characteristics of indicators, computer-implemented machine learning models, etc. The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the vehicle propulsion system 106, the braking system 108, and/or the steering system 110 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   at least one light source;
   a plurality of sensors that generate a plurality of sensor signals, the plurality of sensor signals indicative of a person in a driving environment of the autonomous vehicle; and
   a computing system that is in communication with the light source and the plurality of sensors, wherein the computing system comprises:
      a processor; and
      memory that stores computer-executable instructions that, when executed by the processor, cause the processor to perform acts comprising:
         determining that the autonomous vehicle is to execute a maneuver that will cause the autonomous vehicle to traverse a portion of the driving environment;
         predicting a future path of the person that traverses the portion of the driving environment, the future path of the person being predicted based upon the plurality of sensor signals;
         causing the light source of the autonomous vehicle to output a first visual indicator perceivable external to the autonomous vehicle or a second visual indicator perceivable external to the autonomous vehicle, wherein the first visual indicator indicates that the autonomous vehicle plans to execute the maneuver subsequent to the person traversing the portion of the driving environment, and wherein the second visual indicator indicates that the autonomous vehicle plans to execute the maneuver prior to the person traversing the portion of the driving environment; and
         causing the light source to direct emission of the first visual indicator or the second visual indicator on a ground in the driving environment at a location of the person, wherein the light source is orientable to emit the first visual indicator or the second visual indicator on the ground at different areas around the driving environment such that the light source continually articulates and redirects the emission of the first visual indicator or the second visual indicator on the ground in the driving environment at the location of the person as the location of the person changes while traversing the driving environment.

2. The autonomous vehicle of claim 1, wherein the autonomous vehicle further comprises a vehicle propulsion system and a braking system, the acts further comprising:
   controlling at least one of the vehicle propulsion system or the braking system to execute the maneuver subsequent to the person traversing the portion of the driving environment or controlling at least one of the vehicle propulsion system or the braking system to execute the maneuver prior to the person traversing the portion of the driving environment.

3. The autonomous vehicle of claim 1, wherein a characteristic of the first visual indicator and a characteristic of the second visual indicator are based on a type of the person, wherein the type of the person is one of:
   a pedestrian;
   a cyclist; or
   an operator of a vehicle.

4. The autonomous vehicle of claim 1, wherein the light source emits the first visual indicator with a first coloring when the autonomous vehicle plans to execute the maneuver subsequent to the person traversing the portion of the driving environment, wherein the light source emits the second visual indicator with a second coloring when the autonomous vehicle plans to execute the maneuver prior to the person traversing the portion of the driving environment.

5. The autonomous vehicle of claim 1, further comprising:
   at least one speaker, wherein the at least one speaker is configured to emit a first audible indicator or a second audible indicator, wherein the first audible indicator is emitted when the light source outputs the first visual indicator, and wherein the second audible indicator is emitted when the light source outputs the second visual indicator.

6. The autonomous vehicle of claim 1, wherein the portion of the driving environment is an intersection of a first road and a second road, wherein the autonomous vehicle arrives at the intersection from the first road at a certain time, wherein a vehicle operated by the person arrives at the intersection from the second road at the certain time.

7. The autonomous vehicle of claim 1, the acts further comprising:
   prior to causing the autonomous vehicle to output the first visual indicator or the second visual indicator, determining that the person is expected to yield to the autonomous vehicle based upon the plurality of sensor signals, wherein outputting the second visual indicator is based upon determining that the person is expected to yield to the autonomous vehicle.

8. The autonomous vehicle of claim 1, the acts further comprising:

prior to causing the autonomous vehicle to output the first visual indicator or the second visual indicator, determining that the person is expected to fail to yield to the autonomous vehicle based upon the plurality of sensor signals, wherein outputting the first visual indicator is based upon determining that the person is expected to fail to yield to the autonomous vehicle.

9. The autonomous vehicle of claim 1, wherein the first visual indicator has a first intensity and the second visual indicator has a second intensity, wherein the first intensity is varied based upon a distance between the autonomous vehicle and the person, and wherein the second intensity is varied based upon the distance between the autonomous vehicle and the person.

10. The autonomous vehicle of claim 1, wherein a characteristic of the first visual indicator and a characteristic of the second visual indicator are a function of weather conditions in the driving environment.

11. The autonomous vehicle of claim 1, wherein a characteristic of the first visual indicator signifies that the first visual indicator is intended to be communicated to the person detected in the driving environment, and wherein a characteristic of the second visual indicator signifies that the second visual indicator is intended to be communicated to the person detected in the driving environment.

12. The autonomous vehicle of claim 1, wherein the light source further emits the first visual indicator or the second visual indicator to highlight on the ground the future path of the person predicted to traverse the portion of the driving environment.

13. A method performed by an autonomous vehicle operating in a driving environment, the method comprising:
   determining that the autonomous vehicle is to execute a maneuver that will cause the autonomous vehicle to traverse a portion of the driving environment;
   predicting a future path of a person in the driving environment that traverses the portion of the driving environment, the future path of the person being predicted based upon a plurality of sensor signals generated by a plurality of sensors of the autonomous vehicle;
   determining whether the autonomous vehicle is to yield to the person when the person traverses the portion of the driving environment;
   when the autonomous vehicle is to yield to the person:
      outputting a first visual indicator perceivable external to the autonomous vehicle, wherein the first visual indicator indicates that the autonomous vehicle plans to execute the maneuver subsequent to the person traversing the portion of the driving environment, wherein the first visual indicator is directed on a ground in the driving environment at a location of the person, and wherein outputting the first visual indicator further comprises orienting a light source of the autonomous vehicle to emit the first visual indicator on the ground at differing areas around the driving environment such that the light source continually articulates and redirects emission of the first visual indicator on the ground in the driving location at the location of the person as the location of the person changes while traversing the driving environment; and
      controlling at least one of a vehicle propulsion system of the autonomous vehicle or a braking system of the autonomous vehicle to execute the maneuver subsequent to the person traversing the portion of the driving environment; and
   when the person is to yield to the autonomous vehicle:
      outputting a second visual indicator perceivable external to the autonomous vehicle, wherein the second visual indicator indicates that the autonomous vehicle plans to execute the maneuver prior to the person traversing the portion of the driving environment, wherein the second visual indicator is directed on the ground in the driving environment at the location of the person, and wherein outputting the second visual indicator further comprises orienting the light source of the autonomous vehicle to emit the second visual indicator on the ground at the differing areas around the driving environment such that the light source continually articulates and redirects emission of the second visual indicator on the ground in the driving environment at the location of the person as the location of the person changes while traversing the driving environment; and
      controlling at least one of the vehicle propulsion system or the braking system to execute the maneuver prior to the person traversing the portion of the driving environment.

14. The method of claim 13, further comprising:
   outputting a first audible indicator with the first visual indicator when the autonomous vehicle is to yield to the person; and
   outputting a second audible indicator with the second visual indicator when the person is to yield to the autonomous vehicle.

15. The method of claim 13, wherein the first visual indicator and the second visual indicator each has a type, wherein the type is determined based on characteristics of the driving environment as ascertained by the autonomous vehicle using the plurality of sensor signals.

16. The method of claim 13, wherein a characteristic of the first visual indicator and a characteristic of the second visual indicator are based on a type of the person, wherein the type of the person is one of:
   a pedestrian;
   a cyclist; or
   an operator of a vehicle.

17. The method of claim 13, wherein:
   the first visual indicator is further directed at the future path of the person predicted to traverse the portion of the driving environment to visually highlight the future path of the person as predicted; and
   the second visual indicator is further directed at the future path of the person predicted to traverse the portion of the driving environment to visually highlight the future path of the person as predicted.

18. An autonomous vehicle comprising:
   a computer-readable storage medium that comprises instructions that, when executed by one or more processors, cause the one or more processors to perform acts comprising:
      determining that the autonomous vehicle is to execute a maneuver that will cause the autonomous vehicle to traverse a portion of a driving environment of the autonomous vehicle;
      predicting a future path of a person in the driving environment that traverses the portion of the driving environment, the future path of the person being predicted based upon the plurality of sensor signals;
      determining whether the person is expected to yield to the autonomous vehicle or is expected to fail to yield to the autonomous vehicle based upon the plurality of sensor signals; and responsive to determining that the person is expected to yield to the autonomous vehicle, controlling a light source of the autonomous vehicle to output a first visual indicator perceivable external to the autonomous vehicle, wherein the first visual indicator indicates that the autonomous vehicle plans to execute the maneuver prior to the person traversing the portion of the driving environment, wherein the first visual indicator is outputted for a first duration of time during which the autonomous vehicle traverses the portion of the environment prior to the person traversing the portion of the driving environment, and wherein the first visual indicator is outputted such that the light source continually articulates and redirects the first visual indicator on a ground in the driving environment at different locations of the person over time as the person traverses the driving environment.

19. The autonomous vehicle of claim 18, wherein the first visual indicator that is outputted is directed at the person and the future path of the person predicted to traverse the portion of the driving environment to visually highlight the future path of the person as predicted.

20. The autonomous vehicle of claim 18, the acts further comprising:

responsive to determining that the person is expected to fail to yield to the autonomous vehicle, controlling the light source of the autonomous vehicle to output a second visual indicator perceivable external to the autonomous vehicle, wherein the second visual indicator indicates that the autonomous vehicle plans to execute the maneuver subsequent to the person traversing the portion of the driving environment, wherein the second visual indicator is outputted for a second duration of time during which the person traverses the portion of the driving environment prior to the autonomous vehicle traversing the portion of the driving environment, and wherein the second visual indicator is outputted such that the light source continually articulates and redirects the second visual indicator on the ground in the driving environment at the different locations of the person over time as the person traverses the driving environment.

* * * * *